July 8, 1958 E. L. WEBER 2,841,855
CLAMP
Filed Jan. 20, 1955
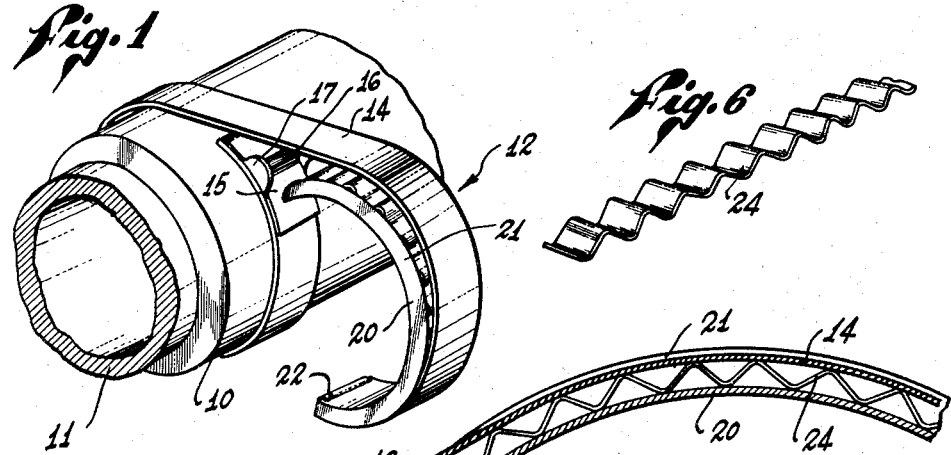
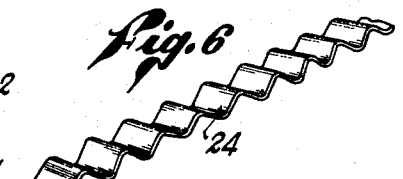
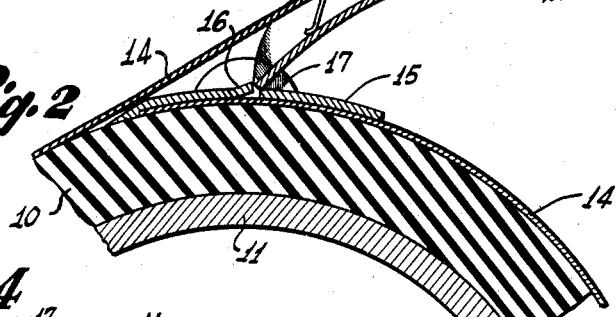
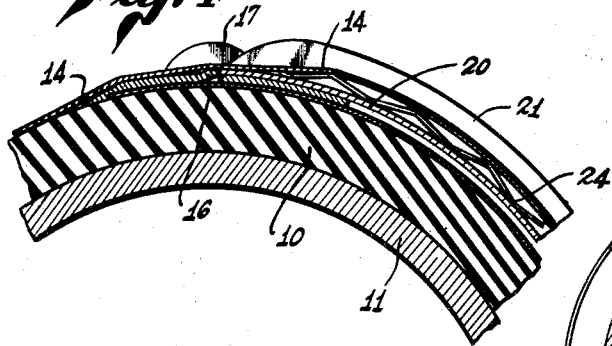
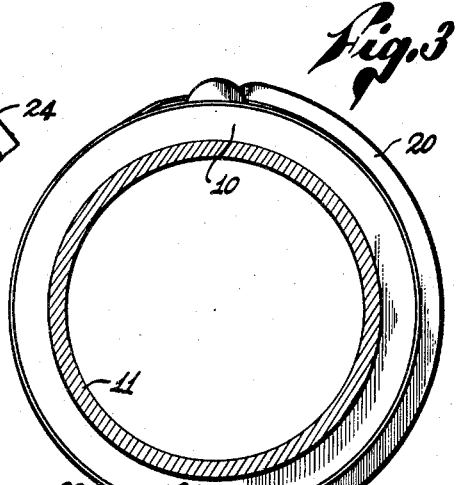
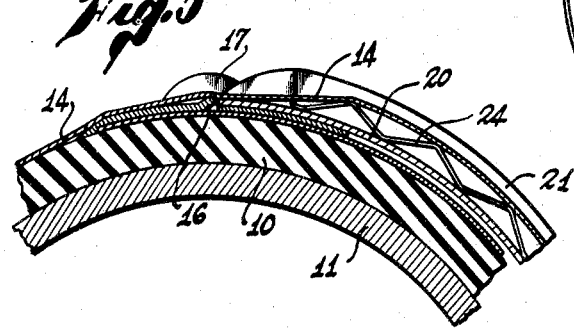
INVENTOR.
EDWIN L. WEBER
BY
Attorneys United States Patent Office 2,841,855
Patented July 8, 1958

2,841,855
CLAMP

Edwin Leroy Weber, Van Nuys, Calif.

Application January 20, 1955, Serial No. 482,952

7 Claims. (Cl. 24—273)

This invention relates generally to clamps and more particularly to an encircling compression clamp used for clamping hose, tubing, and the like.

The present clamp is of the general type shown in my previous Patent No. 2,449,798, issued September 21, 1948, for Hose Clamp, and reference is made thereto for a complete discussion of the advantages of this type of clamp. An embodiment of the subject invention provides a clamp which may be considered as an improvement or modification of my prior clamp, and is particularly adapted for use where cold flow or other condition causing size reduction of the article being clamped may occur.

While there are many types of clamps capable of exerting a high circumferential clamping or compressive force upon initial installation, they do not have any means for compensating for a reduction in size of the article being clamped. Accordingly, should a reduction in size take place all of the clamping pressure is almost immediately lost. For example, in the modern airplane there are many clamped hose connections in the various fluid systems used, and it is imperative that no leakage occur. Since the airplane may be subjected to extreme temperature changes, it can be appreciated that expansion and contraction of the hose material is constantly taking place. These changes alone may result in a drop of the clamping pressure below the operating pressure in the fluid systems so that leakage occurs. Also, it can be understood that many deformable and plastic materials are subject to cold flow under high clamping pressures. That is, the material of the hose or other clamped article tends to move away from the area where pressure is applied and permanent deformation takes place. Such changes in size and shape of the hose, likewise have a direct effect upon the circumferential clamping pressure being exerted. For these reasons, very frequent and rigid schedules have been set up for inspecting and tightening clamped connections in aircraft.

With the foregoing in mind it is an object of this invention to provide a clamp having compensating or take-up means for maintaining proper clamping pressure upon size reduction of the article being clamped.

Another object of the invention is to provide a clamp which exerts a substantially uniform clamping pressure notwithstanding size reduction of the article being clamped.

It is also an object of the invention to provide a clamp of the character described which can be quickly attached and released without adjustment, and which does not require periodic tightening to maintain clamping pressure.

A further object of the invention is to provide a clamp having pressure compensating or take-up means in the form of a spring so mounted as to have a uniform urging rate upon compression and expansion.

Still another object of the invention is to provide a clamp which can be economically manufactured and will give long and trouble-free service.

These and other objects and advantages of the invention will become apparent from the following detailed description of a preferred form thereof, and from an inspection of the accompanying drawings in which:

Figure 1 is a perspective view of the clamp shown installed around a hose before the tightening movement has been completed;

Figure 2 is a sectional detail of the clamp showing the movement of the clamp arm towards the tightening or clamped position;

Figure 3 is an end elevation partially in section showing the clamp in fully tightened position;

Figure 4 is a detail similar to Figure 2 showing the arm moved inwardly to the fully tightened position;

Figure 5 is a view similar to Figure 4 showing the take-up action of the clamp upon size reduction of the article being clamped;

Figure 6 is a perspective view of the spring take-up or compensating means.

Referring now to the drawings and particularly to Figure 1 thereof, the numeral 10 indicates a tubular hose adapted to be frictionally clamped to an inner pipe 11. In the typical installation, hose 10 is of plastic or rubber-like deformable material and pipe 11 is of rigid metal. A preferred embodiment of my invention is indicated generally at 12 and is adapted to be wrapped around hose 10 in encircling relationship so as to exert an inward compression or tightening force which binds the hose tightly to inner pipe 11.

The clamp 12 is formed with an elongated flexible strap or band 14 which is of a length such as to completely encircle the outer surface of hose 10 and provide an additional overlapping portion. Strap 14 is preferably a flat flexible strip of strong material which is not subject to stretching or elongation under the clamping pressures utilized. At the inner end of strap 14 is an arcuate saddle or seat 15 which is secured rigidly to the strap by spot welding or the like, and is formed of relatively heavy and non-flexible material. The inner surface of saddle 15 has a radius of curvature substantially the same as that of hose 10, and thus fits closely over the strap 14 which extends along the periphery of the hose. Near the longitudinal center of saddle 15 is a raised lug 16 which forms a fulcrum edge or step facing towards the outer end of strap 15. Lug 16 may be conveniently outstruck from the surface of saddle 15 by a stamping operation. Also, at the same time, a pair of side guide ears 17 may be formed on saddle 15 to project outwardly and define a central strap receiving channel. As the outer end of strap 14 is wrapped around hose 10, it is brought over saddle 15 and guided by ears 17 to overlap the inner portion of itself. Ears 17 may also be utilized for attaching a seal if desired.

Secured to the outer end of strap 14 is an arcuate clamping arm 20 which has a radius of curvature slightly less than that of hose 10 and a length which is slightly more than one half the circumference of the hose. Thus, as can be appreciated, the opening across the two ends of arm 20 is smaller than the diameter of the hose 10. Arm 20 is preferably formed as a relatively heavy metal stamping having outturned side flanges 21 which are spaced apart so as to define a central channel adapted to receive strap 14 therein. Strap 14 is passed over the top of arm 20 and is secured to the extreme outer end of the arm in any suitable manner. As shown, arm 20 is formed with an end slot 22 and strap 14 is passed therethrough and bent back sharply to form a holding loop 23.

The construction just described is such that strap 14 may be wrapped around hose 10 with saddle 15 seated on the hose at the inner end of the strap, and the center end passed over the saddle and extended outwardly with arm 20 as is shown in Figure 1. The inner end of arm 20 is then seated against fulcrum 16 and pivoted inwardly towards hose 10. As this is done the strap 14 is pulled tightly around hose 10 to exert a compressive clamping force. As the outer end of arm 20 reaches the hose it is snapped or resiliently forced over the large diameter of the latter so as to be locked in position.

Thus far described, the construction and operation of the clamp is quite similar to that of the clamp disclosed in my aforesaid patent, and it will be remembered that it is an object of this invention to provide a clamp having means for compensating for size reduction in the hose or other article being clamped. To this end, I provide a compensating or takeup means in the form of an elongated spring 24 as is shown separately in Figure 6. Spring 24 is of undulating shape in edge view and is formed from a band or sheet of metal of approximately the same width as strap 14 and of suitable resilient material. In effect, spring 24 provides a series of similar bowed springs tied together endwise with each section of the spring having individual resistance to compressive forces exerted across the upper and lower surfaces of the spring.

Spring 24 is positioned to extend around the outer surface of arm 20, lying within the channel formed by side flanges 21 and held in position by the overlying strap 14. It should be particularly noted, that spring 24 has a free longitudinal sliding relationship to both arm 20 and strap 14 and is held only by frictional resistance. As is seen in Figure 2, spring 24 initially underlies strap 14 so that the latter is held outwardly a considerable distance from the wall of arm 20. Continued inward rotation or pivoting of arm 20 to the position shown in Figure 4 causes strap 14 to be pulled inwardly or tightened around hose 10 and at the same time spring 24 is flattened downwardly towards the bottom wall of arm 20. In this position, hose 10 is clamped around pipe 11 with the desired circumferential compression, and spring 24 is resiliently compressed with the same force.

It is characteristic of spring 24 as herein employed, that it has a substantially uniform rate of deformation relative to its resisting force. That is, spring 24 resists deformation and exerts an outwardly directed reactive force against strap 14 which remains substantially constant throughout its change of shape from the position shown in Figure 2 to Figure 4. This characteristic has been determined from laboratory tests, and is presently believed to result from the fact that the spring has the shape as described and is free for relative longitudinal sliding movement between strap 14 and arm 20.

When the clamp is closed as shown in Figures 3 and 4, the desired clamping force is exerted inwardly to compress hose 10 around pipe 11, and at the same time spring 24 is reacting outwardly against strap 14 with an equal force. Under these conditions assume that due to cold flow of the material in hose 10, or due to a substantial temperature change, there is a reduction in the circumferential length of hose 10 relative to that of strap 14. In an ordinary clamp it can be understood, that this will result in a loosening of the clamping strap on the hose and a loss of substantially all of the clamping pressure. Accordingly, fluid leakage through the hose connection to pipe 11 can take place.

However, under the same conditions in the present clamp, reduction in the size of hose 10 is offset by the tendency of spring 24 to return to its original shape as is indicated in Figure 5, thus urging strap 14 outwardly to maintain the clamping pressure on the hose. Since the rate of deformation of spring 24 relative to the resisting force is substantially uniform as has been discussed, the clamping pressure on the hose will remain substantially constant throughout changes in shape of spring 24 back towards its original undeformed position.

It can be appreciated, that the use of the compensating means as described in no way interferes with the repeated use of the clamp in the normal manner, and in fact overcomes any differences in clamping pressure due to minor size variations in the wall thickness and diameter of hose 10. Likewise, the complete clamp is very simple to manufacture and assemble, and all of the parts are designed for trouble free service.

While I have shown a preferred embodiment of the invention, modifications of design and construction can be made without departing from the principles of the invention. Therefore, I do not wish to be restricted to the foregoing details except as defined in the appended claims.

I claim:

1. A clamp comprising: an elongated strap adapted to wrap around the article to be clamped and having an inner end with a fulcrum thereon; a spring-like arcuate clamping arm attached to the outer end of said strap and having a surface spaced inwardly therefrom and adapted to seat on said fulcrum, said arm having a length greater than one-half the circumference of said article and the ends thereof spaced apart a distance less than the diameter of said article whereby said arm may be rotated about said fulcrum and resiliently forced over said article to draw and retain said strap over said fulcrum and tightly about said article; and a spring member arranged in the form of a corrugated strip underlying said strap and resiliently compressible to urge said strap radially outwardly and maintain clamping pressure upon circumferential reduction of said article.

2. A clamp comprising: an elongated strap adapted to wrap around the article to be clamped and having an inner end with a fulcrum thereon; a clamping arm underlying and supporting said strap and having its outer end attached to the outer end of said strap, and its inner end adapted to seat on said fulcrum whereby said arm may be rotated inwardly about said fulcrum to draw and retain said strap over said fulcrum and said arm along the entire length of the latter and about said article being clamped; and an elongated spring arranged in the form of a corrugated strip interposed between said strap and said arm in slidable relationship, said spring being resiliently compressible to urge said strap radially outwardly when said arm is rotated inwardly.

3. A clamp comprising: an elongated flexible strap adapted to wrap around the article to be clamped; a saddle attached to the inner end of said strap and having a portion adapted to act as a fulcrum; a spring-like arcuate clamping arm attached to the outer end of said strap and having a surface spaced inwardly therefrom and adapted to seat on said fulcrum, said arm having a length greater than one-half the circumference of said article and the ends thereof spaced apart a distance less than the diameter of said article whereby said arm may be rotated about said fulcrum and resiliently forced over said article to draw and retain said strap over said fulcrum and tightly about said article; and a resilient compressible spring member underlying said strap and yieldably urging said strap radially outwardly to maintain clamping pressure upon circumferential reduction of said article.

4. A clamp comprising: an elongated flexible strap adapted to wrap around the article to be clamped; a saddle attached to the inner end of said strap and having a portion adapted to act as a fulcrum; a clamping arm underlying and supporting said strap and having its outer end attached to the outer end of said strap, and its inner end adapted to seat on said fulcrum whereby said arm may be rotated inwardly about said fulcrum to draw and retain said strap over said fulcrum and said arm along the entire length of the latter and about said article being clamped; and an elongated spring arranged in the form of a corrugated strip interposed between said strap and said arm in slidable relationship, said spring being resiliently compressible to urge said strap radially outwardly when said arm is rotated inwardly.

5. A clamp comprising: an elongated strap adapted to wrap around the article to be clamped and having an inner end with a fulcrum thereon; a spring-like arcuate clamping arm underlying and supporting said strap and having its outer end attached to the outer end of said strap and its inner end adapted to seat on said fulcrum, said arm having a radius of curvature substantially the same as that of the article being clamped and the length of said arm being more than one-half the circumference of said article whereby said arm may be rotated about said fulcrum and resiliently forced over said article to draw and retain said strap over said fulcrum and thereby be disposed tightly about said article; and an elongated spring having an undulating portion forming a series of similar and interconnected bowed spring portions, said spring being interposed between said strap and said arm in slidable relationship with both ends free, and being resiliently compressible to urge said strap radially outwardly and maintain uniform clamping pressure upon circumferential reduction of said article.

6. A clamp comprising: an elongated flexible strap adapted to wrap around the article to be clamped; a saddle attached to the inner end of said strap and having a portion adapted to act as a fulcrum; a spring-like arcuate clamping arm underlying and supporting said strap and having its outer end attached to the outer end of said strap and its inner end adapted to seat on said fulcrum, said arm having a radius of curvature substantially the same as that of the article being clamped and the length of said arm being more than one-half the circumference of said article whereby said arm may be rotated about said fulcrum and resiliently forced over said article to draw and retain said strap over said fulcrum and tightly about said article; and an elongated spring having undulating spring portions constituting a series of similar and interconnected bowed spring portions, said spring being interposed between said strap and said arm in slidable relationship with both ends free, and being resiliently compressible to urge said strap radially outwardly and maintain uniform clamping pressure upon circumferential reduction of said article.

7. A clamp comprising: an elongated flexible strap adapted to wrap around the article to be clamped; an arcuate saddle attached to the inner end of said strap and having a raised outer portion forming a fulcrum; a spring-like arcuate clamping arm of outwardly open channeled section underlying and supporting said strap and having its outer end attached to the outer end of said strap and its inner end adapted to seat on said fulcrum, said arm having a radius of curvature substantially the same as that of the article being clamped and the length of said arm being more than one-half the circumference of said article whereby said arm may be rotated about said fulcrum and resiliently forced over said article to draw and retain said strap over said fulcrum and lightly about said article; and an elongated spring having an undulating portion forming a series of similar and interconnected bowed spring portions, said spring being seated within said arm and beneath said strap in free sliding relationship, and being resiliently compressible to urge said strap radially outwardly and maintain uniform clamping pressure upon circumferential reduction of said article.

References Cited in the file of this patent

UNITED STATES PATENTS

| | | |
|---|---|---|
| 1,564,837 | Edeborg | Dec. 8, 1925 |
| 2,449,798 | Weber | Sept. 21, 1948 |

FOREIGN PATENTS

| | | |
|---|---|---|
| 283,445 | Great Britain | Jan. 12, 1928 |
| 663,925 | France | Apr. 15, 1929 |
| 131,640 | Switzerland | May 1, 1929 |
| 258,388 | Switzerland | Sept. 1, 1949 |
| 271,714 | Switzerland | Feb. 1, 1951 |